United States Patent
Bodog

(10) Patent No.: US 9,253,660 B2
(45) Date of Patent: Feb. 2, 2016

(54) REPORTING IN COMMUNICATIONS SYSTEMS

(75) Inventor: Gyula Bodog, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 6 days.

(21) Appl. No.: 13/983,663

(22) PCT Filed: Feb. 18, 2011

(86) PCT No.: PCT/EP2011/052441
§ 371 (c)(1),
(2), (4) Date: Aug. 5, 2013

(87) PCT Pub. No.: WO2012/110100
PCT Pub. Date: Aug. 23, 2012

(65) Prior Publication Data
US 2013/0324106 A1    Dec. 5, 2013

(51) Int. Cl.
*H04W 24/02* (2009.01)
*H04W 24/10* (2009.01)
*H04W 76/02* (2009.01)

(52) U.S. Cl.
CPC ............. *H04W 24/02* (2013.01); *H04W 24/10* (2013.01); *H04W 76/02* (2013.01)

(58) Field of Classification Search
CPC ..... H04W 76/02; H04W 24/02; H04W 24/10; H04W 24/08; H04W 16/18; H04W 24/00; H04W 12/02
See application file for complete search history.

(56) References Cited

U.S. PATENT DOCUMENTS 6,269,244 B1 * 7/2001 Alperovich et al. .......... 455/433
2004/0097237 A1   5/2004 Aoyama
(Continued)

FOREIGN PATENT DOCUMENTS

JP   2008-538879 A   11/2008
JP   2012-129641 A    7/2012
(Continued)

OTHER PUBLICATIONS

3GPP / 3GPP TS 32.422 V10.2.1 (Jan. 2011) Technical Specification 3rd Generation Partnership Project; Technical Specification Group Services and System Aspects; Telecommunication management; Subscriber and equipment trace; Trace control and configuration management (Release 10) / Jan. 17, 2011.
(Continued)

*Primary Examiner* — Khalid Shaheed
*Assistant Examiner* — Ernest Tacsik
(74) *Attorney, Agent, or Firm* — Squire Patton Boggs (US) LLP

(57) ABSTRACT

A communication network comprises a management system, a core network element, and a radio access network element. The core network element may be a subscriber database or a mobility entity. It is capable of: receiving consent information; receiving from the management system a measurement reporting activation in a network; checking whether at least part of the activation request applies to a subscriber for whom consent information consenting to measurement reporting has been provided; and in the event that consent information consenting to measurement reporting has been provided, enabling the activation request by communicating with the radio access network element so that measurement reporting in respect of that subscriber may take place. The measurement reporting activation may be for subscriber-based or area-based measurements to be made.

9 Claims, 2 Drawing Sheets

(56) References Cited

U.S. PATENT DOCUMENTS

Figure 1:
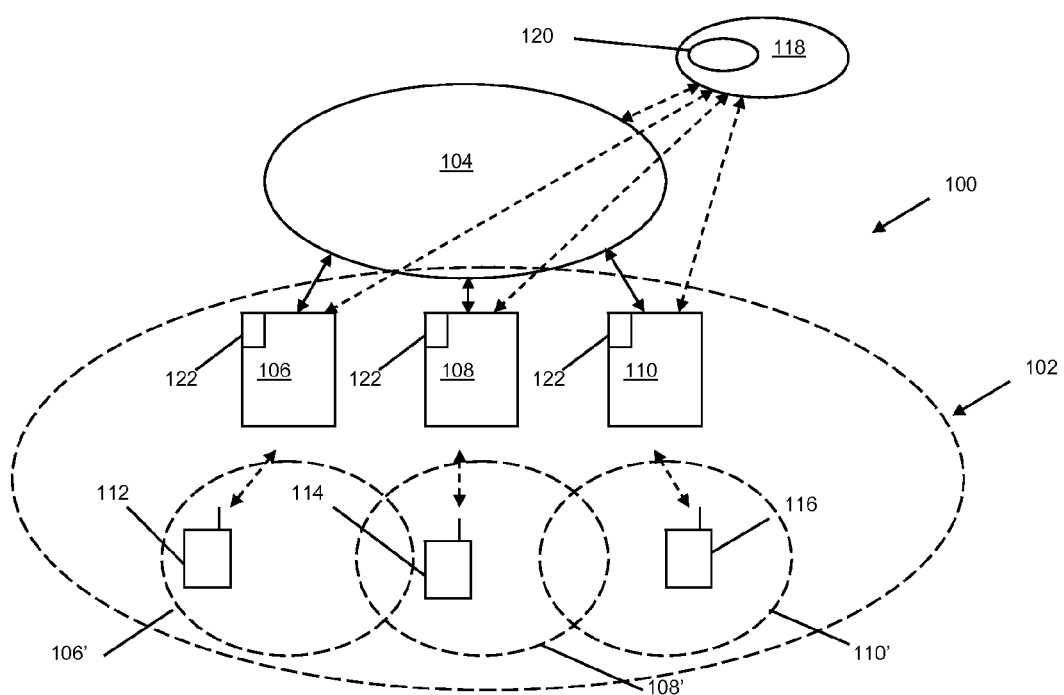

| | | | |
|---|---|---|---|
| 2005/0032532 A1* | 2/2005 | Kokkonen et al. | 455/456.6 |
| 2006/0246920 A1 | 11/2006 | Shim | |
| 2007/0041330 A1* | 2/2007 | Bostica et al. | 370/252 |
| 2007/0226701 A1 | 9/2007 | Suonvieri et al. | |
| 2012/0208503 A1 | 8/2012 | Johansson | |
| 2013/0267238 A1 | 10/2013 | Hapsari et al. | |

FOREIGN PATENT DOCUMENTS

| | | |
|---|---|---|
| RU | 44907 U1 | 3/2005 |
| WO | WO 99/65261 A2 | 12/1999 |

OTHER PUBLICATIONS

3GPP TSG-SA WG3 Meeting #61 S3-101422 Sorrento, Italy Nov. 15-19, 2010; review of MDT design and reply LS on Security Issues with Logged MDT / NTT Docomo.

3GPP TSG-SA5 (Telecom Management) S5-112152 SA5#77, May 9-13, 2011; Shenzhen, P.R. China; Aligning MDT activation procedures with SA3 privacy requirements; Nokia Siemens Networks et al.

TSG SA Meeting #51 SP-110186 Mar. 21-23, 2011, Kansas City, USA; Adding user consent handling in MDT activation; Nokia Siemens Networks.

Japanese Notice of Reason for Rejection application No. 2013-553805 dated Jun. 18, 2014.

International Search Report and Written Opinion dated Dec. 14, 2011 corresponding to International Patent Application No. PCT/EP2011/052441.

Decision to Grant dated Apr. 27, 2015, issued in corresponding RU Patent Application No. 2013141467/07 (with English translation).

Korean Office Action (Notice to File a Response) dated Nov. 13, 2014 corresponding to Korean Patent Application No. 10-2013-7024649 and English translation thereof.

Nokia Siemens Networks et al., "MDT configuration parameters," 3GPP TSG-RAN WG2 Meeting #71, Madrid, Spain, Aug. 23-27, 2010, R2-104904, Aug. 23, 2010, 4 pages.

NTT Docomo, "On UE selection and MDT policy configuration," 3GPP TSG-RAN2#69bis, Beijing, China, Apr. 12-16, 2010, R2-102439, Apr. 12, 2010, 5 pages.

NEC, "Insert user consent in MDT activation mechanism," 3GPP TSG-SA5 (Telecom Management), SA5#75, Jan. 24-28, 2011; Sorrento, Italy, S5-110246 Jan. 24, 2011, 8 pages.

* cited by examiner

REPORTING IN COMMUNICATIONS SYSTEMS

This invention relates to reporting in communications systems. It is particularly, but not exclusively, related to measurement reporting in mobile communications systems. It may apply to a cellular mobile communications system.

An important aspect in network planning to provide a wireless communications system is in ensuring that a network provides the necessary coverage. This may be to provide even coverage or to provide uneven coverage, for example better coverage being provided in areas in which there is the heaviest wireless communications traffic. Coverage in this sense usually refers to the signal strength experienced by a mobile terminal in a cell. It may also refer to the reliability of inter-cell handover. It may relate to link quality.

Although there have been considerable improvements made in network planning over the past few years enabling a planned network to have the kind of coverage which is desired, the operation of a network implemented according to such a plan may not be exactly as intended. For this reason, mobile network operators employ a procedure referred to as drive testing in which vehicles equipped with special testing equipment travel around the area covered by a mobile network and collect measurement data at different geographical locations in the form of parameters, such as signal strength. This means that a mobile network operator can identify problems such as coverage holes or places where handover tends to fail, and change the configuration of the network to ameliorate these problems, for example by adding base stations, or changing beam orientation of existing base stations.

Carrying out drive testing to obtain measurement data is expensive and inconvenient, both in terms of the cost of the necessary equipment and of employees' or contractors' time. Therefore, it is desired to minimise the amount of drive testing which is conducted. It has been proposed in 3GPP (3rd Generation Partnership Project) to use subscriber mobile terminals (also referred to as user equipment or UE) to provide measurement data related to quality of connection over an air interface between themselves and a radio access network (RAN) of a mobile network, and to use this data in a network management system of the network in order to reduce the need to carry out drive tests. Although this may not completely eliminate the need for drive testing, it is hoped that if the majority of coverage assessments can be carried out based on automatically collected measurement data obtained by the RAN in communicating with subscriber mobile terminals, there is scope for considerable cost savings. The capability to provide the necessary measurement data from subscriber mobile terminals to minimise the amount of drive testing required is referred to as minimisation of drive test (MDT) functionality.

MDT measurement reporting can be carried out to gather data in one cell or a pre-defined list of cells or to gather data in respect of a subscriber in which data is collected for a particular mobile terminal irrespective of the cell to which it has moved. In each case, it is triggered by a management entity sending an MDT measurement request to a network element in the RAN, either directly in the case of cell- or area-based reporting, or indirectly via network elements in a core network in the case of individual subscriber-based reporting.

A relevant network element in the RAN is a functionality controlling radio resource management of base station-type network elements. It may be an eNodeB (eNB). For the sake of simplicity, in the following, the term "base station" is intended to refer to base stations having incorporated into them functionality controlling radio resource management and also to refer to such functionality being a separate entity with respect to the base station-type network element it controls.

The management entity is typically present in an operations, administration, and maintenance (OAM) function, also referred to as a management system.

When the RAN element becomes configured for MDT it activates a particular mobile terminal, or selected mobile terminals, which it is serving to carry out MDT measurements and to provide it with MDT measurement data. The RAN element provides MDT measurement data to the management entity, in particular a trace collection entity (TCE) present in the management system, which collects and processes them to produce results relating to location-based network performance.

Since it is possible to associate MDT measurements from mobile terminals, and thus the subscriber operating the terminals, MDT may provide information of subscriber identities, together with geographical locations and corresponding times (timestamps) at those locations. Therefore, it can be used to enable a network operator to track when and where a given user has been. This raises issues of privacy and the need to get user consent, or also to revoke previously given user consent, for their mobile terminals to be used for MDT. Accordingly, regulations in certain regions or countries require prior user consent to permit MDT activities for a given subscriber.

In order to obtain this user consent before initiating MDT, or to revoke previously obtained user consent, it has been proposed to use the customer care process. This may be seeking the consent during interaction between a representative of the network operator, or an intermediary, and the user. For example, consent may be given at the time a subscriber takes out a subscription with the network operator. This approach generally assumes that the customer (subscriber) will contact the network operator, directly or indirectly, to withdraw any given consent.

Another way of obtaining consent is to rely on functionality present in mobile terminals. Before MDT measurements are carried out, such a mobile terminal uses the functionality to request, via a graphical user interface (GUI), user consent. However, this represents an expensive solution because it would require all MDT capable devices to implement the functionality and the corresponding GUI. Furthermore, there would need to be a number of country specific GUIs both in terms of local customisation, language, etc, and the need to obtain consent in a way which is in accordance with local regulations. Therefore, the preferred solution is for the network operator to get user consent via the customer care process.

According to a first aspect of the invention there is provided a method of measurement reporting activation in a network, the method comprising the steps of:

providing consent information to a network element;
receiving an activation request;
checking whether at least part of the activation request applies to a subscriber for whom consent information consenting to measurement reporting has been provided; and
in the event that consent information consenting to measurement reporting has been provided, enabling the activation request so that measurement reporting in respect of that subscriber may take place.

In the event that consent information consenting to measurement reporting has been provided, the network element may identify a mobility entity with which the subscriber is registered. The network element may send the activation request to the mobility entity which is then able to route the activation request to a relevant base station control functionality which is serving the subscriber.

Preferably, in the event that consent information consenting to measurement reporting has not been provided, the activation request is not enabled in order for measurement reporting in respect of that subscriber may take place. This may involve rejecting the activation request. It may involve not sending the activation request. It may involve sending the activation request and carrying out measurements but not associating the measurements with an identifier of the subscriber in the case that consent in respect of that subscriber has not been provided.

The activation request may be in respect of a subscriber. It may be a subscriber-based request. It may be in respect of an area. It may be an area-based request. In the case of an area-based request, it may trigger measurements be a number of subscriber terminals. Checking of consent information for a number of corresponding subscribers may occur after such measurements have been made.

The consent information may be provisioned to a network element. It may be provisioned to a subscriber database. It may be provisioned at the time of setting up a subscription. It may be provisioned at a later point. It may be provisioned as a result of a user notifying a network operator of a problem and the network operator deciding to do a subscriber trace. It may be provisioned by a subscription management functionality.

The consent information may be provided to a core network element. It may be kept in a main or master subscription database. The consent information may be provided to one network element and then may be additionally provided to another network element. It may be additionally provided to another core network element. It may be additionally provided to a mobility entity. Checking may occur at the network element to which the consent information was provided. It may occur at the network element to which the consent information was additionally provided.

The activation request may be enabled by sending it to a relevant base station control functionality. It may be enabled by associating measurement data with an identifier of the subscriber. This may occur in a measurement collecting entity.

Preferably, the activation request is sent to a mobility entity which then carries out a check to see whether the subscriber has consented to measurement reporting. In such a case, the consent information may have been transferred there and stored in a visitor subscriber database of the mobility entity. The consent information may be sent to a mobility entity with which the subscriber is registered. It may be sent in an update location answer message. This may be in response to an update message regarding location/area. It may be sent together with subscriber data.

Preferably, in the case of an area-based activation, a mobility entity checks whether the subscriber in question has provided consent for measurements to be carried out by a mobile terminal the subscriber is using. The mobility entity may send subscriber identity information to a measurement collection entity in order for the measurements gathered by the mobile terminal to be associated with the subscriber identity. It may also send a measurement identifier.

The method may provide an automated process confirming that consent has been obtained. The consent information may be added to subscription data.

Preferably, the measurement reporting is in respect of measurements conducted by mobile terminals which are instructed to provide measurement data related to air interface conditions between themselves and a network.

The invention may be applicable to each of LTE and 3G systems. It may apply to both.

According to a second aspect of the invention there is provided a network element, the network element being capable of:
  receiving consent information;
  receiving a measurement reporting activation in a network;
  checking whether at least part of the activation request applies to a subscriber for whom consent information consenting to measurement reporting has been provided; and
  in the event that consent information consenting to measurement reporting has been provided, enabling the activation request so that measurement reporting in respect of that subscriber may take place.

Preferably, the network element is a subscriber database. It may be a mobility entity.

According to a third aspect of the invention there is provided a communication network comprising a management system, a core network element, and a radio access network element, wherein the core network element is capable of:
  receiving consent information;
  receiving from the management system a measurement reporting activation in a network;
  checking whether at least part of the activation request applies to a subscriber for whom consent information consenting to measurement reporting has been provided; and
  in the event that consent information consenting to measurement reporting has been provided, enabling the activation request by communicating with the radio access network element so that measurement reporting in respect of that subscriber may take place.

Preferably, the core network element is a subscriber database. It may be a mobility entity.

According to a fourth aspect of the invention there is provided a computer program product comprising software code that when executed on a computing system performs a method of measurement reporting activation in a network, the method comprising the steps of:
  providing consent information to a network element;
  receiving an activation request;
  checking whether at least part of the activation request applies to a subscriber for whom consent information consenting to measurement reporting has been provided; and
  in the event that consent information consenting to measurement reporting has been provided, enabling the activation request so that measurement reporting in respect of that subscriber may take place.

Preferably, the computer program product has executable code portions which are capable of carrying out the steps of the method.

Preferably, the computer program product is stored on a computer-readable medium. It may be stored in a non-transient manner.

Figure 2:
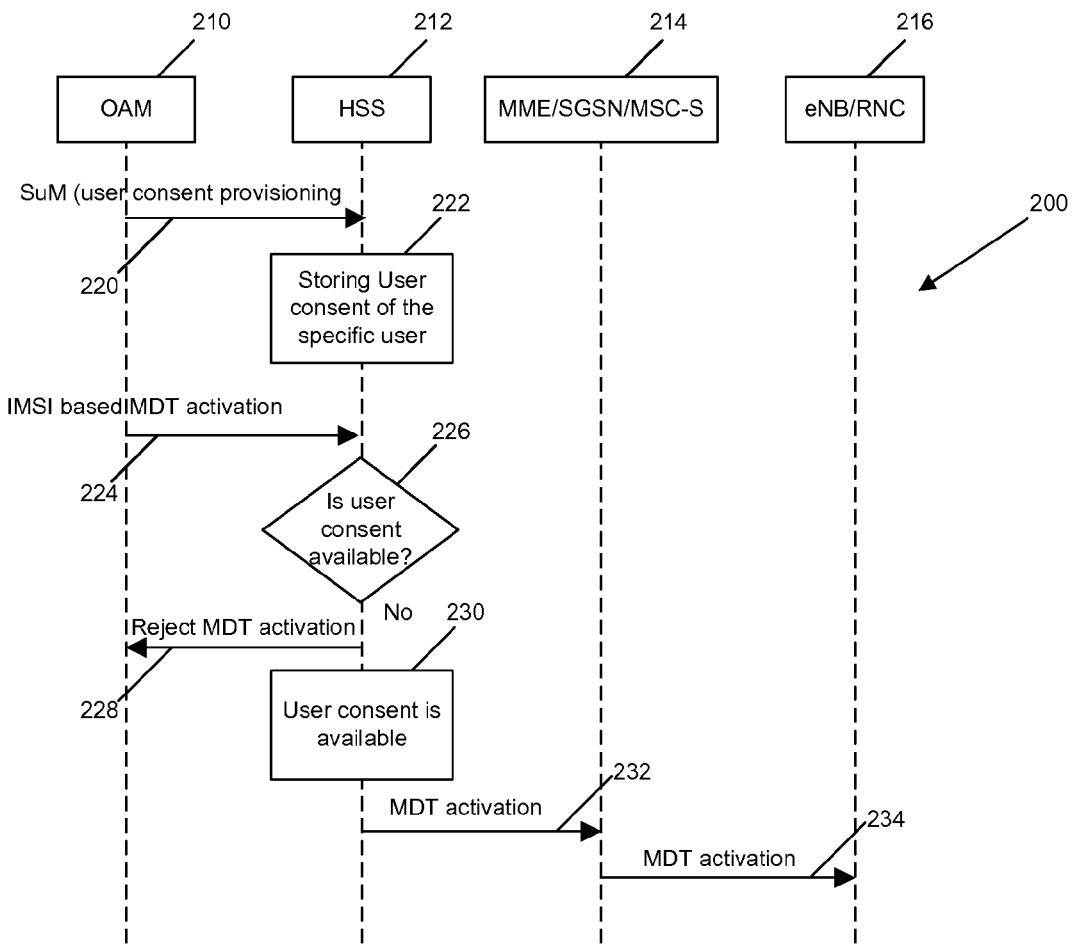

Embodiments of the invention will now be described, by way of example only, with reference to the accompanying drawings in which:
  FIG. 1 shows a system according to the invention; and
  FIG. 2 shows a message flow diagram showing a consent-based MDT activation operation.

The invention will now be described with respect to FIG. 1. FIG. 1 shows an LTE mobile communications network 100 comprising a RAN 102 and a core network 104. The RAN has a number of base stations 106, 108, and 110 which provide radio access to mobile terminals 112, 114, and 116 present in cells 106', 108', and 110', and the core network 104 has functionality to provide for call switching/routing and call control, service provision, authentication and charging, and interconnection enabling access to other networks. In this embodiment, the base stations are eNBs.

In addition, an operations, administration, and maintenance (OAM) function 118 is linked to the core network 104 and to the RAN 102 and is capable of configuring and provisioning network nodes of the RAN 102 and the core network 104. Such aspects of control are shown in FIG. 1 by dashed lines between the OAM function 118 and the RAN 102 and the core network 104.

Although in FIG. 1 the OAM function 118 is shown as a unitary entity, it may be divided into an element management (EM) layer and a network management (NM) layer. The EM layer can be considered to be a distributed entity and the NM can be considered to be a centralised entity.

The EM layer and the NM layer communicate over an Itf-N interface separating them by means of integration reference points (IRPs). In this case, an IRPAgent associated with a network element (NE) is able to send notifications to an IRPManager present in the NM layer, for example relating to the operation of the NE, and the IRPManager is able to send commands to IRPAgents in order to control the operation of NEs. The IRPAgent may be part of an NE such as an eNB or may be an EM entity.

The OAM function 118 carries out various related tasks such as collecting network statistics, alarm monitoring and logging of events. The resulting statistics, alarms, and logs are used by a network operator to monitor the health and performance of the network 100. The OAM function 118 is a separate system from the core network 104 although both the core network 104 and the OAM function 118 may be present within the domain of the network operator with both being under its control.

The OAM function 118 is provided with an MDT management entity 120. This entity 120 controls MDT operation within the network 100, for example receiving requests/instructions to arrange for MDT measurements to be gathered in respect of a particular subscriber or a specific geographic area of the network 100, and then sending out a necessary MDT request so that a base station or base stations can activate MDT measuring by a particular mobile terminal or by mobile terminals present in a particular location or locations. The MDT management entity 120 in the OAM function 118 cooperates with MDT units 122 in the base stations which receive MDT-related commands and take appropriate action. For example, an MDT unit 122 in a particular base station receives a command that MDT measurements are to be carried out in a particular cell and, as a result, it applies individual MDT configurations to suitable mobile terminals located in the cell which cause the mobile terminals to start making MDT measurements and to provide MDT reports to the base station. The base station sends the MDT measurements in the form they are received or collates or otherwise processes them, and then sends them to the OAM function 118 where they may be processed and used to generate output data suitable for use in managing the network 100.

The invention will now be described with reference to obtaining consent for, firstly, subscriber-based MDT measurement reporting and, secondly, area-based MDT measurement reporting.

Obtaining consent for subscriber-based MDT measurement reporting is shown in FIG. 2. This is a message flow diagram showing a consent-based MDT activation operation 200. As can be seen from this Figure, the operation takes place in a network comprising an OAM 210, a Home Subscriber Server (HSS) 212, a mobility entity 214 (here identified by MME/SGSN/MSC-S), and a base station control functionality 216 (here identified as an eNB or an RNC).

It will be understood that the systems of FIG. 1 and FIG. 2 correspond although are presented differently.

Although only one mobility entity 214 and base station control functionality is shown, it will be appreciated that there may be a plurality of each of these elements in the network. The HSS 212 and the mobility entity 214 are located in a core network and the base station control functionality 216 is located in a RAN.

The mobility entity 214 is a generalised term referring to each of a number of core network entities which are responsible for mobility management. These may be a mobility management entity (MME), a serving GPRS support node (SGSN), and a mobile switching centre server (MSC-S). The particular core network entity being employed in the operation of FIG. 2 depends on which radio access network the subscriber is in and in what type of connection is being made. If the subscriber is in an LTE E-UTRAN the core network entity is an MME, and if the subscriber is in a third generation (3G) UTRAN the core network entity may be an SGSN or an MSC-S, with the SGSN being used in the case of a data connection, and the MSC-S being used in the case of a voice call. It is for this reason that the base station in FIG. 2 is referred to as an eNB/RNC because the type of base station being used depends on whether the subscriber is in a 3G or an LTE RAN.

The HSS is the main, or master, subscriber database for the network. However it is not the only subscriber database because the specific core network elements comprising the mobility entity 214 will typically have their own "visitor subscriber databases" which include information about the subscribers which are, at least for the time being, under their control and/or located in areas for which a specific core network element is responsible.

According to the invention, the HSS 212 is provided with consent information about a particular subscriber 220. This is referred to in FIG. 2 as user consent provisioning. Here, it is shown taking place as part of a subscription management (SuM) operation provided by interaction between a SuM functionality and the HSS 212. Such a functionality is typically provided by a business support system (BSS) which is useable to provision subscriber data into the HSS. It may be associated with the OAM 210. Providing the consent information may occur during the setting-up of a subscription, in which a network operator uses the SuM functionality to obtain access to the HSS 212 to provision a subscription and to add to the HSS 212 a subscription identifier such as an international mobile subscriber identity (IMSI), and also those services which are available to that subscriber. However, as described in the following, consent information can be added by the SuM at any suitable time, for example whenever user consent is obtained by a network operator.

The consent information identifies the subscriber and also an indication of whether the subscriber has given consent, or has not given consent, to the subscriber's mobile terminal being used to carry out and provide MDT measurements. In addition to being added to the HSS 212 at the time of setting up a subscription, it can happen at a later stage. For example it may happen as a result of a user notifying a network operator of a problem and the network operator deciding to do a subscriber trace. Consent may be provided during this process, either explicitly or implicitly, and provisioned to the HSS. Accordingly, this would be part of a subscription modification operation rather than a subscription set-up operation.

In the case of existing subscribers for whom consent was not obtained during subscription set-up, consent may be obtained during a fault investigation process as described in the foregoing, or as part of an interaction between the subscriber and the network operator. This could be at any suitable time, for example when there is engagement between the subscriber and the network operator about changing a subscription.

Therefore, it will be recognised that the SuM functionality is capable of handling user consent and enables the network operator to manage user consent of a specific user.

In a provisioning operation 220, the indication of user consent is stored 222 in the HSS in a record associated with that subscriber. In this way, the consent information may be considered to be part of subscription data stored in the HSS.

At a later point in time, there may be a request submitted for MDT measurements to be carried out in respect of a particular subscriber. This may have been triggered by, for example, a subscriber making a complaint about poor coverage in a specified area, or a more general problem. As a result, the OAM 210 sends an IMSI-based MDT activation instruction 224 containing an MDT configuration to the HSS 212. Rather than automatically storing the MDT configuration in its subscriber database and forwarding on the MDT activation instruction to the MME at which the subscriber is registered, the HSS 212 carries out an internal check 226 to determine the status of consent for that user. The outcomes may be that consent is not available or that it is available. In the former case, if consent is not available, the HSS 212 rejects the MDT activation instruction 228 before the MDT activation instruction is sent to the MME and as a result the activation instruction is not sent. Consent may be not available if the subscriber has specifically stated that consent has been withheld or that no consent information has ever been provided to the HSS 212. In the latter case, that is "User consent is available" 230, the HSS determines that conducting MDT measurements can be activated for that subscriber, it stores the MDT configuration, and then identifies the MME at which the subscriber is registered. The HSS sends 232 the MDT activation instruction to the relevant MME which is then able to route 234 the MDT activation instruction to the relevant base station control functionality 216 which is serving the subscriber.

The MDT activation can then be processed in a known manner with the mobility entity 214 instructing the relevant base station control functionality 216.

It should be noted that in the event of a "no" decision in block 226, the step 228 is carried out, and the further steps, 230, 232, and 234 do not take place, and in the event of a "yes" decision in block 226, the step 228 is not carried out, and the further steps, 230, 232, and 234 do take place.

The foregoing is described in relation to the HSS 212 being sent, and handling, the MDT activation instruction for subscriber-based MDT measurements. The system 100 may be configured so that the instruction is sent directly to the mobility entity 214 therefore by-passing the HSS 212. In this case, the OAM 210 sends an IMSI-based MDT activation instruction 224 containing an MDT configuration to the mobility entity 214 which then carries out a check to see whether the subscriber has provided consent. If this check reveals that such consent has been given, the mobility entity 214 sends the MDT activation instruction to the relevant base station control functionality 216. If this check reveals that such consent has not been given, the mobility entity 214 does not send the MDT activation instruction to the relevant base station control functionality 216. It may return a "rejection of activation" notification.

In a system 100 having a capability for consent checking to be carried out by the mobility entity 214, consent information is still added to the HSS by using the SuM functionality. However, it is also necessary for the consent information to be made available to the mobility entity 214 so it is transferred there and stored in the visitor subscriber database of the mobility entity 216. The consent information is only sent to the mobility entity 214 where the subscriber is registered. This is known via the relevant attach procedure which has been carried out. To explain briefly, the mobility entity 214, that is the MME, the SGSN, or the MSC-S, responsible for a subscriber may change. In this case the mobile terminal sends a suitable area update to the mobile entity whose area it is now located. In 3G systems, location or routing area updates are sent to the MSC-S or SGSN respectively. In LTE systems, tracking area updates are sent to the MME. These updates notify the mobility entity 214 that the mobile terminal is now in a location under its control. When the mobility entity 214 receives an area update, it checks whether it has any data for that mobile terminal and, if not, it contacts the HSS 212 with an update location request message. Sending this message does two things. It updates the HSS 212 with information about which mobility entity 214 is responsible for the subscriber and enables the HSS 212 to respond with an update location answer message which includes subscriber data. According to the invention, this data can contain the consent information. It may be sent in an update location answer message or it may be sent in a separate message.

It will be appreciated that the system 100 can be configured to carry out checking of consent information for MDT measurements either in the HSS 212, or in the 214, or in both with the location of the checking being decided based on the nature of the MDT activation instruction, such as whether it has been sent to the HSS 212 or the mobility entity 214, or based on some other criteria.

Obtaining consent for area-based MDT measurement reporting will now be described. Activation for area-based MDT data collection in an LTE system is described in 3rd Generation Partnership Project, Technical Specification TS32.422, and particular detail is provided in section 4.1.1.6a.

In the case of area-based MDT measurements, mobile terminals are not selected on the basis of their subscribers but on the basis of their location (or locations). A single area-based activation instruction may be used by a base station controlling functionality to instruct a number of mobile terminals, selected according to relevant criteria, to gather MDT measurement reports in the area before information concerning the subscribers using those mobile terminals is available. In this case, following an MDT measurement report having been provided to an eNB by one of the mobile terminals, when the eNB indicates to a mobility entity such as an MME the mobile terminal which was used to gather the MDT measurements, the MME is able to determine the subscriber identity information, for example IMSI, for this mobile terminal, in order to have this subscriber identity information available to provide it, together with a trace identifier, to a trace collection entity (TCE). This same procedure can be carried out in respect of a number of subscribers. The subscriber identity information relating to measuring mobile terminals may be sent to the trace collection entity either all together or in a number of messages. MDT measurements themselves in respect of all of the measuring mobile terminals may be sent later in one or more measurement record messages.

However, when obtaining the subscriber identity information related to a mobile terminal, the MME also checks whether a particular subscriber has provided consent for MDT measurements to be carried out by the mobile terminal which the subscriber is using. If the mobility entity determines that this particular subscriber has given consent, the MME sends the subscriber identity information, together with the trace identifier, to the trace collection entity in order that, at some point, the set of MDT measurements gathered by the mobile terminal of that subscriber may be associated with the corresponding subscriber identity by means of the trace identifier. If the mobility entity determines that this particular subscriber has not given consent, then the MME does not send the subscriber identity information for that subscriber, to the trace collection entity.

At this stage, different activities may occur depending on the embodiment. In one embodiment, the set of MDT measurements gathered by the mobile terminal of a particular subscriber can be sent to the trace collection entity but cannot be associated with the corresponding subscriber identity information because this information was not provided to the trace collection entity. In another embodiment, the eNB is instructed not to send the set of MDT measurements gathered by the mobile terminal of a particular subscriber to the trace collection entity because there is no corresponding subscriber identity information available at the trace collection entity.

It will be understood that in handling consent for area-based MDT measurements, since checking of the consent information occurs in the MME, the consent information have previously been transferred from the HSS to the MME. This may be done in a way corresponding to that described in the foregoing relating to consent checking at the mobility entity for subscriber-based MDT measurements.

The implementations above in relation to area-based MDT are described in relation to LTE systems. However, they can equally apply to other systems, for example 3G systems, in which case there is communication between a base station control functionality and a mobility entity and between a main or master subscriber database and the mobility entity.

Considered in terms of the Network Resource Model (NRM), the part relating to the SuM functionality may be enhanced to cover user consent provisioning. For example, a consent information attribute may be defined which can be assignable to any suitable object.

The invention provides network functionality in order to obtain user consent before initiating MDT measurements. In fact, it may obviate MDT measurements being carried out at all.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of measurement reporting activation in a network, the method comprising the steps of:
  receiving, at a home subscriber server, consent information;
  receiving, at the home subscriber server, an IMSI-based activation request;
  checking, by the home subscriber server, whether at least part of the activation request applies to a subscriber for whom consent information consenting to measurement reporting has been provided;
  wherein, based on the checking, one of the following is carried out: if consent information consenting to measurement reporting has been provided, enabling the IMSI-based activation request so that measurement reporting in respect of that subscriber may take place; and
  if consent information consenting to measurement reporting has not been provided, the home subscriber server rejects the IMSI-based activation request before the IMSI-based activation request is sent to a mobility management entity and as a result the IMSI-based activation request is not sent to the mobility management entity.

2. A method according to claim 1 in which, if consent information consenting to measurement reporting has been provided, the home subscriber server identifies a mobility entity with which the subscriber is registered.

3. A method according to claim 2 in which, the home subscriber server sends the activation request to the mobility entity which is then able to route the activation request to a relevant base station control functionality which is serving the subscriber.

4. A method according to claim 1 in which, if consent information consenting to measurement reporting has not been provided, not enabling activation request in order for measurement reporting in respect of the subscriber may take place involves sending the activation request and carrying out measurements but not associating the measurements with an identifier of the subscriber.

5. A method according to claim 1 in which the consent information is provided to a first network element and then additionally provided to a second network element.

6. A method according to claim 1 in which the activation request is enabled by associating measurement data with an identifier of the subscriber.

7. A home subscriber server, the home subscriber server being capable of:
  receiving consent information;
  receiving a measurement reporting IMSI-based activation request in a network;
  checking whether at least part of the IMSI-based activation request applies to a subscriber for whom consent information consenting to measurement reporting has been provided;
  if consent information consenting to measurement reporting has been provided, enabling the IMSI-based activation request so that measurement reporting in respect of that subscriber may take place; and
  if consent information consenting to measurement reporting has not been provided, the home subscriber server rejects the IMSI-based activation request before the IMSI-based activation request is sent to a mobility management entity and as a result the IMSI-based activation request is not sent to the mobility management entity.

8. A communication network comprising a management system, a home subscriber server, and a radio access network element, wherein the home subscriber server is capable of:
  receiving consent information;
  receiving from the management system a measurement reporting IMSI-based activation request in a network;
  checking whether at least part of the IMSI-based activation request applies to a subscriber for whom consent information consenting to measurement reporting has been provided;
  wherein, based on the checking, one of the following is carried out:
  if consent information consenting to measurement reporting has been provided, enabling the IMSI-based activation request by communicating with the radio access network element so that measurement reporting in respect of that subscriber may take place; and if consent information consenting to measurement reporting has not been provided, the home subscriber server rejects the IMSI-based activation request before the IMSI-based activation request is sent to a mobility management entity and as a result the IMSI-based activation request is not sent to the mobility management entity.

9. A computer program product, embodied on a non-transitory computer readable medium, comprising software code that when executed on a computing system performs a method of measurement reporting activation in a network, the method comprising the steps of:

receiving, at a home subscriber server, consent information;

receiving, at the home subscriber server, an IMSI-based activation request;

checking, by the home subscriber server, whether at least part of the activation request applies to a subscriber for whom consent information consenting to measurement reporting has been provided;

wherein, based on the checking, one of the following is carried out:

if consent information consenting to measurement reporting has been provided, enabling the IMSI-based activation request so that measurement reporting in respect of that subscriber may take place; and if consent information consenting to measurement reporting has not been provided, the home subscriber server rejects the IMSI-based activation request before the IMSI-based activation request is sent to a mobility management entity and as a result the IMSI-based activation request is not sent to the mobility management entity.

* * * * *